Jan. 31, 1956  A. MEIXNER  2,732,776
PHOTOGRAPHIC CAMERA OBJECTIVE ATTACHING MEANS
Filed June 28, 1952  2 Sheets-Sheet 1

INVENTOR.
ALFRED MEIXNER
BY Mock + Blum
MOCK & BLUM
ATTORNEYS

Jan. 31, 1956          A. MEIXNER          2,732,776
PHOTOGRAPHIC CAMERA OBJECTIVE ATTACHING MEANS
Filed June 28, 1952          2 Sheets-Sheet 2
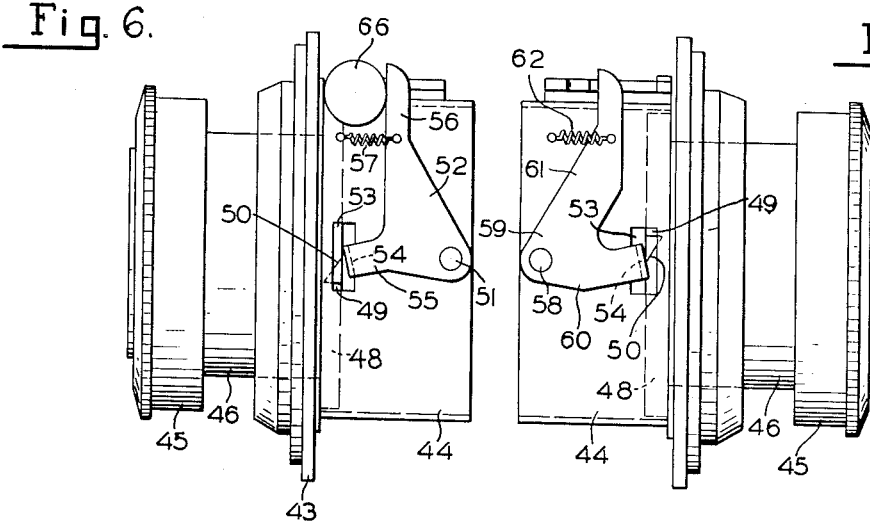
*INVENTOR.*
ALFRED MEIXNER
BY Mock & Blum
MOCK & BLUM
ATTORNEYS

United States Patent Office 2,732,776
Patented Jan. 31, 1956

2,732,776

PHOTOGRAPHIC CAMERA OBJECTIVE ATTACHING MEANS

Alfred Meixner, Braunschweig, Germany, assignor to Voigtlander, A. G., Braunschweig, Germany, a corporation of Germany Application June 28, 1952, Serial No. 296,104

Claims priority, application Germany July 17, 1951

13 Claims. (Cl. 95—39)

This invention relates to photographic cameras provided with a tube carrying the objective and it has particular relation to photographic cameras of this type, comprising improved means for locking and securing the tube in the exactly correct position for taking pictures.

In known cameras of the above mentioned type, it is conventional to cause the tube to slide back into the camera casing, when not in use, in order to keep the objective in protected position. For taking a picture, the tube and the objective are advanced until a stop is reached.

It is the main object of this invention to lock the tube in taking position and secure it in this position so that the objective is held in the exactly correct position.

Other objects and the advantages of the invention will be apparent from the appended drawings and the following specification which describes, by way of example and without limitation, some embodiments of the invention.

In carrying out the present invention, the tube is automatically locked and prevented from moving backward, upon reaching the taking position, and is simultaneously pressed by pressure and wedge effect against its abutment which is firmly connected with the camera. This means according to the present invention represents a very simple mechanism which does not require particular actuation and is nevertheless extremely safe. The additional application of wedge effect in combination with the pressure exerted by the locking means, guarantees immobility of the objective in its correct position, and this is of decisive importance in connection with the quality of the photographic picture.

In a preferred embodiment of the invention members having a locking and wedge effect are used, which are radially movable from outside to inward direction and preferably act elastically.

According to a preferred embodiment of the invention, the automatic locking and wedging movement of the pressure and locking members is operated by shifting the tube to its taking position. In a modification which is of particular advantage in practice, the tube is provided with radially outward jutting parts which cause outward movement of the radially acting, elastically inward pressing locking members, in the last phase of the advance of the tube, and bring about wedging subsequently. It is preferred to apply to the jutting out parts of the tube, inclined surfaces which, during displacement of the tube, first have a displacing effect on the elastic locking members and, after passing, release said members, so that they can enter the locking position.

The wedge effect on the tube advanced to the taking position is brought about by action of the beforementioned inwardly elastic press and locking members, on a wedge surface provided therefor, of the jutting collar of the tube. Thereby, springs, bolts, or the like, can be used as locking means; they are arranged in such manner that they pass through slots in a guide casing, in which displacement of the tube with its beforementioned jutting part, to the front or rear position, takes place. The locking elements are arranged in such manner that, although they project to the range of movement of the jutting out part, during said passing, they do not engage the tube body proper and thus do not interfere with the movement of the tube.

The press and locking members, which are elastic in inward direction, can be designed as pins having wedge-like points, which are carried by springs and in their passing through perforations of the guide casing into the interior of the latter, get wedged with the radially outward projecting flange of the tube, so that the latter is pressed against the abutment. Instead of the beforementioned wedge-like pins, balls can be used which exert the desired wedge-effect on the jutting out edges of the tube by means of their curved surface.

It is, of course, necessary to provide also means for releasing the above described locking and wedging device, in order to effect return of the tube into its rest position. In the case of the above described press and locking members, this can be effected by swinging the latter, by manual operation of the tube, preferably by turning the tube, from the press and locking position to the release position. In using the beforementioned elastic pins, or the like, which project through slots into the interior of the guide casing, the length of these slots is determined in such manner that, upon turning the tube, the locking members are displaced from the slots over the corner edges of the same. Thus, the jutting out collar of the tube can be returned to the rest position, i. e. into the interior of the camera casing.

In another modification of this unlocking device, a rotatable ring is arranged on the inwardly extending radial flange of the guide casing, said flange forming the abutment for the outwardly jutting part of the objective tube. Upon turning said rotatable ring, it bears with its outward directed projections against adjacent locking springs. The wedge-like stretched pins fastened to the springs are thus displaced from the beforementioned perforations of the guide casing to such extent that the tube can be retracted without obstruction.

In another modification for simultaneous locking and pressing the tube by wedge-effect against the abutment, a thread is applied to the abutment. A movable part, for example a threaded ring, presses, when turned, the tube with wedge-effect against the abutment. Thereby, this ring presses on those parts of the tube which have been introduced between the ring and the abutment. Bayonet flaps having incisions, are preferably used on the tube. The elastically pressing threaded ring is provided with radial flaps projecting in inward direction, which are overlapping with the radially outward jutting bayonet flaps arranged on the tube, in locking position. The elastically pressing threaded ring is provided with a pin or the like, serving as a handle, which is operated against spring effect, thus causing turning back the threaded ring on the threaded bolt of the abutment plate to such extent, that the bayonet flaps of the tube are screwed in between the abutment and the locking flaps of the locking ring, or can be removed again from this position.

The drawings illustrate some embodiments of the invention, to which the invention is not limited.

Figure 6 illustrates a camera tube, viewed from the side, in its guide casing, fastening of the tube in the taking position being effected by an angle lever, while its release is effected by a double-armed lever acting on the angle lever;

Figure 7 is a view of the tube and its guide casing shown in Figure 6, viewed from the other side of the casing;

Figure 8 is a top view of the tube and its guide casing and illustrates the double-armed lever which can be caused by a control key to swing and thereby causes the lateral angle levers to swing to the release position.

Figure 1:
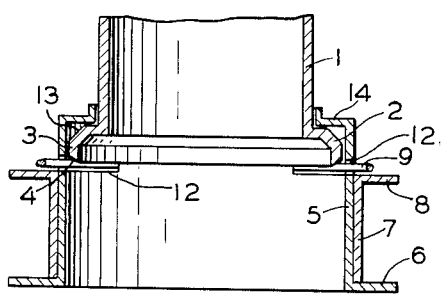
Figure 1 is a sectional view of a camera tube in its guide sleeve, in advanced position.

In Figure 1, reference numeral 1 denotes the tube of a photographic camera, not shown. This tube is provided with a radially jutting collar 2 and the latter has a part 3 extending in axial direction to the interior of the camera. Said extension 3 is provided with a chamfering 4 which is directed toward the axis of the tube. Tube 1 is guided by a likewise tubular guide casing 5, which is connected with a base plate 6, for example the wall of the camera. Guide casing 5 is enclosed by a sleeve 7 which is rotatable on casing 5. One edge of sleeve 7 lies on base plate 6, while the other edge of sleeve 7 forms a wide flange 8 which extends in an angle of 90° to the sleeve. On the surface of said flange 8 three bar springs 9 are fastened in such manner that one of their ends is hooked in holes of flange surface 8 while the other end of said springs is held by hooks 11 consisting of upward bent portions of the flange. Guide casing 5 is provided with three slots 12 which are arranged at the same level and the middle portions of said springs 9 pass through said slots. If tube 1 is inserted in guide casing 5, said springs 9 do not touch the wall of the tube, because the diameter of tube 1 is smaller than the inner diameter of guide casing 5. If the tube is advanced outward to the taking position shown in Figure 1, chamfered portion 13 of the tube comes first in contact with the middle portions of the springs, which project into the interior of the casing. Springs 9 are urged outward and, therefore, bent. When the projecting part 2 of tube 1 has moved past the springs, said springs 9 snap behind the tube and press against chamfered portions 4. Thereby, by a wedge-like effect, the tube is pressed against front abutment 14 formed by casing 5 and is held there without harmful play. In order to release the connection, it is sufficient to turn sleeve 7 with the springs, relative to casing 5. Thereby, springs 9 are pressed out by the non-slotted portion of guide casing 5, from slots 12 and are bent over the corner edges of the latter. They will then lie on the outer periphery of casing 5 so that there is no projection of springs 9 into the interior. Therefore, tube 1 can be inserted without obstruction.

Figure 3:
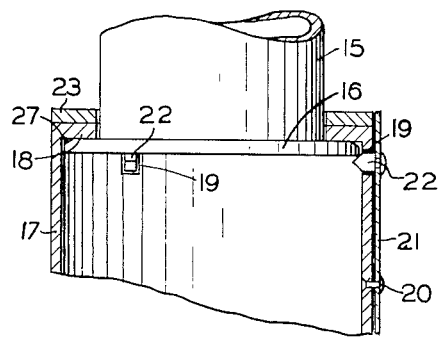
Figure 3 illustrates another fastening device between the tube and guide sleeve.
Figure 2:
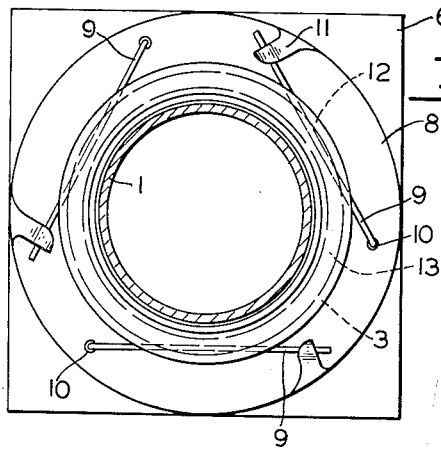
Figure 2 is a top view of the device shown in Figure 1.
Figure 4:
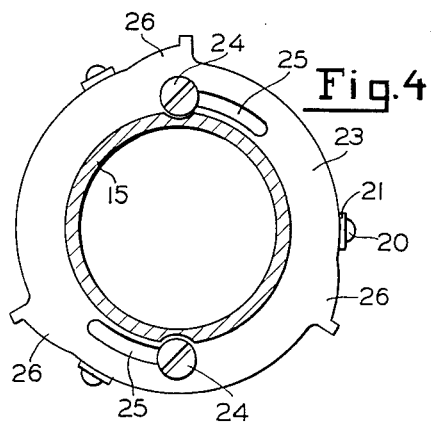
Figure 4 is a top view of the device shown in Figure 3.

Tube 15, illustrated in Figures 3 and 4, is provided with a radially outward projecting end flange 16. Guide casing 17, which is likewise of tubular shape, is provided with an inwardly projecting flange 18 serving as abutment and with three perforations 19 arranged on its periphery. On the outer surface of guide casing 17, three axially directed bar springs 21 are fastened by means of rivets 20. Said springs 21 act on pins 22 having wedge-like points and press said pins through perforations 19 to the interior of guide casing 17. A rotatable ring 23 which encloses tube 15, is arranged above flange 18 on the front end of guide casing 17 and is held and guided by screws 24 and its slots 25. Ring 25 has wedge-like projections 26 provided on its periphery in uniform distances. The length of springs 21 is selected in such manner that the free end of the springs is on the same level as the outer front surface of ring 23, so that the end of the springs bears against the edge of ring 23. If the tube is inserted in the interior of casing 17 and if it is advanced to the position illustrated in Figure 3, chamfered portion 27 of tube flange 16 comes in contact with the lower wedge surface, in the drawing, of pins 22, presses said pins against the action of springs 21 outwardly and allows tube flange 16 to pass. Immediately after this, pins 22 snap and project again to the interior of the casing. Thereby, their other, upper wedge surfaces press tube 15 forward against its abutment 18 and hold it in this position by wedge effect. If it is desired to retract again tube 15, said wedge connection must be released. This is done by a short turning movement of ring 23. Thereby wedge projections 26 press against the ends of springs 21, so that springs 22 are drawn outward and insertion of tube 15 can take place without obstruction. Subsequently, ring 23 is brought to its original position by turning it backward. Backward turning of ring 23 can be effected also by a draw spring which permanently urges the ring to its original position. The same effect can be obtained by using balls instead of the wedged pins or the like.

Figure 5:
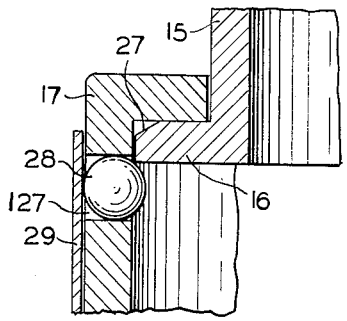
Figure 5 illustrates a fastening device including balls, in sectional view.

This is illustrated in Figure 5. In a perforation 127, the diameter of the inner opening of which is smaller than the diameter of ball 28, in order to prevent falling out of the ball, the ball is held by a leaf spring 29 arranged on the outside, and strongly urged in inward direction. The wedge effect of the balls is brought about by their curved surfaces which press the tube by a wedge-like effect toward its abutment.

In the device illustrated in Figures 6, 7 and 8, in casing 44 provided with front plate 43, tube 46, which carries the camera shutter 45 and the objective, can be caused to move into and outward from the interior of a camera, not shown. Tube 46 is guided in a circular opening of front plate 43 and by a rectangular back plate 48 connected with the tube, said back plate gliding in the interior of the likewise rectangular casing. In radial direction, the tube is provided at its rear end, on two opposite sides, with two projections 49, which are chamfered in the direction of picture taking at 50 and are straight on their side turned toward the interior of the casing. On one side of the casing, an angle lever 52 is pivotally connected with bolt 51; the lower arm 55 of lever 52 is chamfered in the direction of picture taking and is provided with a ledge 54 bent toward the interior of the casing. The upper arm 56 extends upward beyond casing 44 and is urged by spring 57 toward plate 43. On the other side of the casing (see Fig. 10), a similar angle lever 59 is pivotally fastened to bolt 58, and the inclined ledge 54 on the lower arm 60 of lever 59, co-operates in a similar manner with projection 49 of the tube. Upper arm 61 extends likewise upward beyond casing 44, and a spring 62 urges the lever opposite to the taking direction. Lateral openings 53 are provided in casing 44, and bent ledges 54 of angle levers 52 and 59 project through these openings to the interior of the casing, where they can engage with projections 49 of the tube.

A flat key 63 having a press button 66 and provided with two elongated openings 64 is displaceably arranged by means of two bolts 65, which are fastened to the casing, on the third, upper side of the casing, which connects the sides provided with angle levers 52, 59. Spring 67 permanently draws key 63 in outward direction. By means of a third elongated opening 68, key 63 surrounds screw 69 fastened to the casing. A pin 70 projects outwardly from key 63. A double-armed lever 71 is pivotally held by screw 69 and said lever lies flat on key 63. A slot 72 of lever 71 encompasses pin 70 of the key 63. End portions 73, 74 of lever 71 grip behind the end portions projecting beyond the casing, of lateral angle levers 52 and 61, respectively. As will be understood from the drawings, angle lever 52 presses from above against tube projection 49 and angle lever 59 presses from below against projection 49 on the opposite side of the tube. As the arms of lever 71 move in opposite direction, both angle levers are caused in a simple manner to move to the release position.

The above described device operates as follows. Upon advancing tube 46 to taking position, inclined surfaces 50 of tube projections 49 lift ledges 54, i. e. they cause swinging of angle levers 52, 59 against the action of their springs 57, 62. After the taking position is attained, the angle levers swing back under spring action and their ledges 54 fall behind tube projections 49. As the ledges are chamfered in forward direction, they act under spring impulse like wedges and press the tube firmly against its front abutment, i. e. to the correct taking position. In order to release the connection, button 66 is pressed, whereby key 63 is displaced against the action of spring 67. Pin 70 causes swinging of lever 71. Its ends 73 and 74 press upon the end of angle lever arms 56 and 61, whereby the angle levers are caused to swing and tube projections 49 are released. The tube can now be inserted in casing 44.

What is claimed is:

1. A photographic camera comprising in combination a tube carrying the objective, said tube being adapted to be advanced to picture-taking position and to be retracted to rest position from and to the camera casing, respectively; abutment means on the camera casing to limit the axial position of said tube carrying said objective; means for automatically locking the tube in the picture taking position and means for releasing said locking means prior to retraction of the tube toward the rest position, with straight-line axial movement only, and in the absence of any rotary movement of the tube, by the action of a rotary member arranged co-axially with the optical axis of the tube; the tube being thereby locked when it reaches the taking position and being simultaneously pressed by pressure and wedge effect against said abutment fixedly connected with the camera body.

2. A photographic camera as claimed in claim 1, comprising in combination a tube carrying the objective, said tube being adapted to be advanced to a picture-taking position and to be retracted to a rest position, means for automatically locking the tube in the picture-taking position and a rotary member arranged co-axially with the optical axis of the tube, for releasing by turning said member said locking means prior to the retraction of the tube; said tube being provided with radially jutting out parts having inclined surfaces; said jutting out parts being adapted to cause, by means of said inclined surfaces, movement of radially inward pressing locking means, in outward direction, only in the last phase of the advance of the tube and subsequently bringing about fastening of the tube in the picture-taking position.

3. A device as claimed in claim 1, in which the tube is provided with a jutting out collar having a wedge surface, and wedging of the tube advanced to its taking position is effected by action of the radially inward pressing elastic locking means on said wedge surface.

4. A device as claimed in claim 1, which comprises a casing firmly connected with the camera, for guiding the tube, and provided with slots, and in which the tube is provided with radially jutting out parts having inclined surfaces, said jutting out parts being adapted to cause, by means of said inclined surfaces, movement of the radially inward pressing locking means, in outward direction, and said locking means consist of bar springs passing through said slots of the casing in the range of movement of said jutting out parts, without engaging the tube proper.

5. A device as claimed in claim 1, which comprises a casing firmly connected with the camera, for guiding the tube and having slots, and in which the tube has a jutting out collar-like flange, and the locking means consist of pins having wedge-like points, said pins being adapted to pass through said slots of the casing and get wedged with said collar or flange and press it against the abutment.

6. A device as claimed in claim 1, which comprises a casing firmly connected with the camera, for guiding the tube, and in which the tube has a jutting out collar-like flange, and the locking means consist of balls elastically pressed in inward direction and adapted to exert a wedge-like effect on the jutting out collar or flange.

7. A device as claimed, in claim 1, in which the tube is provided with radially jutting out parts having inclined surfaces; said jutting out parts being adapted to cause, by means of said inclined surfaces, movement of the radially inward pressing locking means, in outward direction, in the last phase of the advance of the tube and subsequently bringing about said wedge effect; said device comprising manually operable means for releasing the tube for movement to its rest position, said means being adapted to cause removal of the locking means from the range of movement of the tube and its jutting out parts, by turning the tube.

8. A device as claimed in claim 1, which comprises a casing firmly connected with the camera, for guiding the tube, and provided with slots, and in which the tube is provided with radially jutting out parts having inclined surfaces, said jutting out parts being adapted to cause, by means of said inclined surfaces, movement of the radially inward pressing locking means, in outward direction, and said locking means consist of bar springs passing through said slots of the casing in the range of movement of said jutting out parts, without engaging the tube proper; said slots being dimensioned in such manner that swinging of the bar springs concentrically relative to said casing results in the removal of said springs from the slots, whereupon said bar springs engage the non-slotted outer surface of the casing and release the tube and its jutting out parts, for withdrawal into its rest position within the camera.

9. A photographic camera as claimed in claim 1, which comprises a casing firmly connected with the camera, for guiding the tube and provided with slots, said casing being spanned by a rotatable sleeve havng an outwardly extending flange, and in which the tube is provided with radially jutting out parts having inclined surfaces; said jutting out parts being adapted to cause, by means of said inclined surfaces, movement of the radially inward pressing locking means, in outward direction; said locking means consisting of bar springs, the ends of which are fastened to said outwardly extending flange, so that in their natural condition the springs enter the slots of said casing.

10. A photographic camera comprising in combination (a) a tube carrying the objective, said tube being adapted to be advanced to a taking position and to be retracted to a rest position in the interior of the camera; (b) an abutment connected with the camera body, for the tube; (c) means for automatically locking the tube upon its reaching the taking position and for pressing it by pressure and wedge effect against said abutment, said means being elastically movable radially from outward to inward direction; a casing firmly connected with the camera, for guiding the tube and having slots; the tube having a jutting out collar-like flange adapted to bear against the abutment; the locking means consisting of pins having wedge-like points, said pins being adapted to pass through said slots of the casing, get wedged with said collar-like flange and press it against the abutment; the abutment consisting of a radially inward extending flange of said guide casing; a ring rotatably arranged on said abutment, said ring being provided with outwardly extending projections; bar springs fastened to the outer surface of the guide casing, said springs being connected with and adapted to press said pins through the slots of the guide casing, the ends of said springs lying against said ring, the outwardly extending projections of which are adapted to prop the springs upon turning the ring, so that the pins are retracted from the slots of the guide casing, in order to allow retraction of the tube to the interior of the camera casing .

11. A photographic camera as claimed in claim 10, in which rotating movement of the ring is limited by at least one slot provided in the ring and stop means passing through said slot.

12. In a photographic camera as claimed in claim 1, a tube provided with radially extending projections; a casing for guiding the tube; two angle levers swingable against spring action, arranged on opposite, first and second outer sides of the guide casing, each of said levers having one chamfered end; a swingable double-armed lever arranged on a third side of the camera; said chamfered ends of said angle levers being adapted to engage the radially extending projections of the tube and lock it in the taking position; the other ends of said angle levers cooperating with the arms of said double-armed lever; a push button or key adapted to cause swinging of the double-armed lever which in turn causes swinging of both angle levers, in order to release their engagement with projections of the tube.

13. In a photographic camera as claimed in claim 1, a tube provided with radially extending projections; a casing for guiding the tube; two angle levers swingable against spring action, arranged on opposite, first and second outer sides of the guide casing, each of said levers having one chamfered end; a swingable double-armed lever arranged on a third side of the camera; said chamfered ends of said angle levers being adapted to engage the radially extending projections of the tube and lock it in the taking position; the other ends of said angle levers cooperating with the arms of said double-armed lever; a push button or key adapted to cause swinging of the double-armed lever which in turn causes swinging of both angle levers, in order to release their engagement with projections of the tube; said guide casing being provided with perforations; said projections of the tube having chamfered portions; the chamfered ends of both angle levers having lateral portions which project into the interior of the casing through said perforations and cooperate with projections of the tube; the angle levers being caused to swing against the action of their springs, by cooperation of said lateral portions with chamfered portions of tube projections, upon advancing the tube, said lateral portions acting with wedge effect on tube projections, in taking position.

References Cited in the file of this patent

UNITED STATES PATENTS

| | | |
|---|---|---|
| 2,052,261 | Verschoor | Aug. 25, 1936 |
| 2,093,282 | Leitz et al. | Sept. 14, 1937 |
| 2,126,300 | Wittel | Aug. 9, 1938 |
| 2,238,498 | Mihalyi | Apr. 15, 1941 |
| 2,260,991 | Gorey | Oct. 28, 1941 |
| 2,319,063 | Hutchison | May 11, 1943 |
| 2,467,456 | Baer | Apr. 19, 1949 |
| 2,484,464 | Quigley et al. | Oct. 11, 1949 |